(12) United States Patent
Appelberg et al.

(10) Patent No.: US 7,298,078 B2
(45) Date of Patent: Nov. 20, 2007

(54) FLAT, FLEXIBLE FLUORESCENT LAMP

(75) Inventors: Gustaf T. Appelberg, Fairfield, CT (US); Douglas A. George, Watertown, CT (US); Joseph W. Fleming, Ramsey, NJ (US)

(73) Assignee: E-Lite Technologies, Inc., Trumbull, CT (US)

( * ) Notice: Subject to any disclaimer, the term of this patent is extended or adjusted under 35 U.S.C. 154(b) by 293 days.

(21) Appl. No.: 11/035,646

(22) Filed: Jan. 14, 2005

(65) Prior Publication Data

US 2005/0162078 A1 Jul. 28, 2005

Related U.S. Application Data

(60) Provisional application No. 60/536,635, filed on Jan. 14, 2004.

(51) Int. Cl.
*H01J 1/62* (2006.01)
*H01J 63/04* (2006.01)
(52) U.S. Cl. .................... 313/491; 313/485; 313/486
(58) Field of Classification Search ............ 313/511, 313/485–487, 491
See application file for complete search history.

(56) References Cited

U.S. PATENT DOCUMENTS

| | | | |
|---|---|---|---|
| 4,661,137 A * | 4/1987 | Garnier et al. ............ 65/21.4 |
| 5,019,748 A | 5/1991 | Appelberg ............... 315/169.3 |
| 5,641,426 A * | 6/1997 | Nerad et al. ........... 252/299.01 |
| 6,441,551 B1 * | 8/2002 | Abe et al. .................... 313/503 |
| 6,479,941 B1 * | 11/2002 | Abe et al. ................ 315/169.3 |
| 6,545,422 B1 * | 4/2003 | George et al. ........... 315/169.3 |
| 6,613,455 B1 * | 9/2003 | Matsumoto et al. ........ 428/690 |
| 6,833,669 B2 | 12/2004 | George et al. .............. 313/506 |
| 2002/0195931 A1 * | 12/2002 | George et al. .............. 313/506 |
| 2004/0217693 A1 * | 11/2004 | Duggal et al. .............. 313/504 |

* cited by examiner

*Primary Examiner*—Joseph Williams
*Assistant Examiner*—Bumsuk Won
(74) *Attorney, Agent, or Firm*—Ware, Fressola, Van der Sluys & Adolphson LLP

(57) ABSTRACT

A self-luminous base lamp material for use in construction of a flat flexible fluorescent lamp is disclosed. A layer of fluorescent particles is carried between a rear electrode and front conductor electrode arranged in a parallel plate or split-electrode operative configuration. The fluorescent particles emit light upon excitation by an ultraviolet light source carried between the electrodes in response to energy applied to the electrodes. Inert gas carried in a glass microsphere functions as the ultraviolet source in one embodiment.

8 Claims, 4 Drawing Sheets

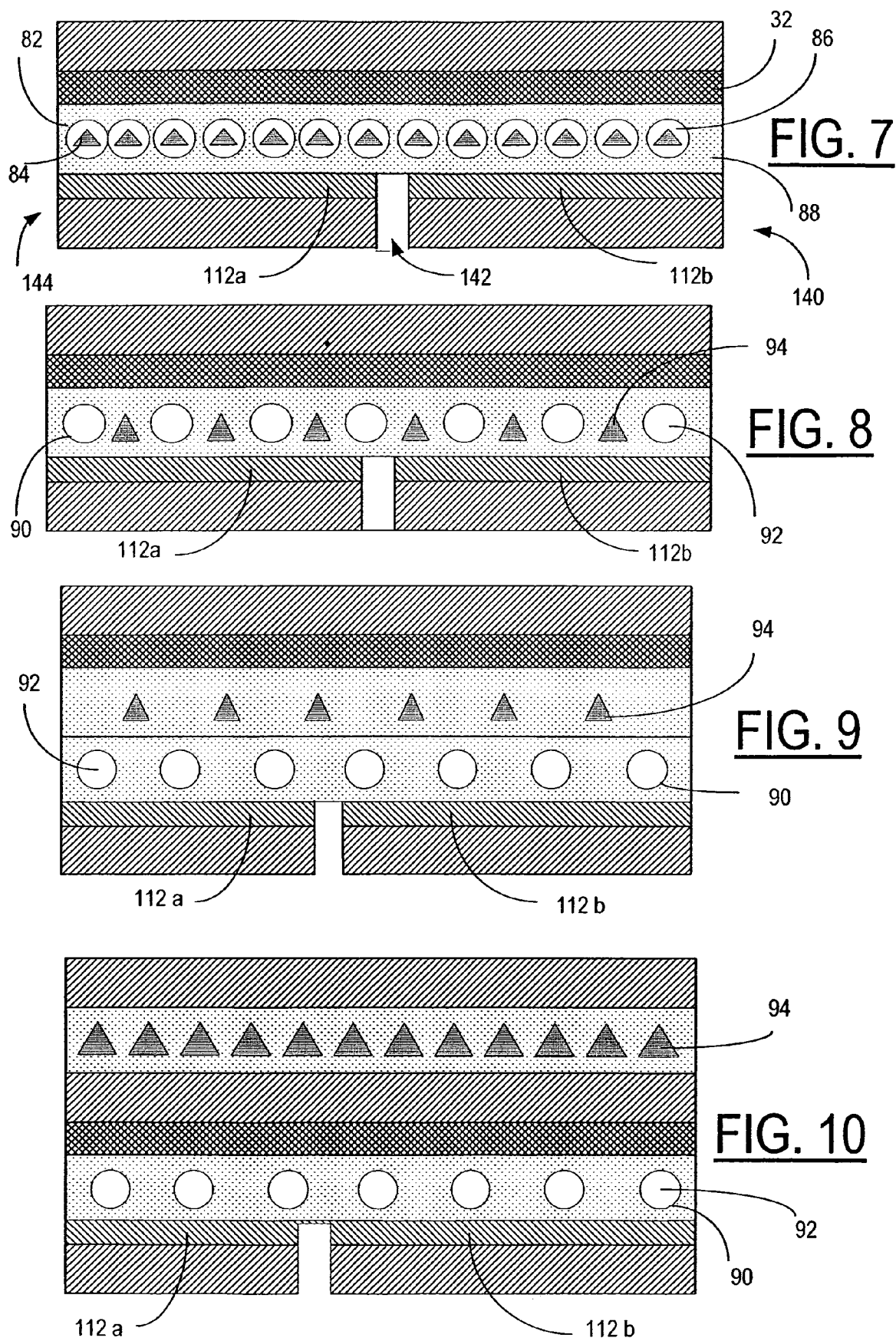

FLAT, FLEXIBLE FLUORESCENT LAMP

This application claims the benefit of priority from U.S. Provisional Application Ser. No. 60/536,635 filed Jan. 14, 2004.

TECHNICAL FIELD

The present invention relates generally to solid state illumination and lighting systems and lamps and deals more specifically with a flat, flexible fluorescent lamp, systems and methods for producing large flat, flexible fluorescent lamps and the construction of such lamps.

BACKGROUND OF THE INVENTION

Fluorescent lamps are generally well known to provide illumination and lighting. A glass tube or envelope is coated or covered on its interior surface with a fluorescent powder typically a phosphor coating using sputtering, vapor deposition or other well known techniques. The tube is filled with an inert gas such as argon or a mixture of argon and neon, and a minute droplet of low pressure mercury vapor. A cap holding an electrode which extends into the glass tube is used to seal each end of the lamp. When the lamp is switched on, a current passes through the electrodes causing them to heat up and emit electrons that electrically charge or ionize the gas within the tube. The ionized gas becomes a conductor allowing increased current, essentially arcing, to jump from one electrode to the other electrode resulting in the emission of ultraviolet radiation. The ultraviolet radiation is then absorbed by the phosphor coating on the inner surface of the tube converting it into visible light. Although fluorescent lamps are in wide spread use in commercial and industrial applications and for lighting systems, there are a number of limitations and drawbacks associated with fluorescent lighting. Typically, the fluorescent tube is limited in the number of different sizes due to the requirement that the lamp must be mounted in a fixture to hold the tube and because the tube must be sealed during manufacture it is impractical to provide many different lengths without custom manufacturer to a given application. Additionally, fluorescent tubes are fragile and unless extreme care is taken in handling the tubes the fluorescent lamp is subject to breakage and possible injury to a user. A further disadvantage of fluorescent lamps is that a high voltage is necessary to start the lamp to initially ionize the inert gas to create the required ultraviolet radiation. Fluorescent lamps are also inefficient with respect to the light produced in that light is directed 360 degrees around the tube and therefore only a portion of the light is directed downward to a work surface or to illuminate a given area. The light that is emitted upward must be reflected through use of reflectors to redirect the light downward to the work surface or area to be illuminated otherwise the light that is generated in the generally upward direction is lost relative to its illumination capability of a work surface or area.

Electroluminescent (EL) lamps and lighting systems such as described in U.S. Pat. Nos. 5,019,748 and 6,833,669, assigned to the assignee as the present invention are known to provide large scale flexible lighting panels that are flexible and not restricted in size at the time of manufacture so that a user may make the panel in a desired size and shape for a particular lighting application without restrictions on the initial manufacturing process. Such EL lamps are manufacturable using roll-to-roll and web-to-web processing currently in widths up to 54 inches and lengths of 2,400 feet. The disclosures of U.S. Pat. Nos. 5,019,748 and 6,833,669 are incorporated herein by reference. The advantage with such EL lamps is that 100 percent of the visible light generated is directed downward toward the work surface or the area to be illuminated and thus increased efficiency over fluorescent lamps. In addition, EL panel lamps such as described above are robust and easily handled by a user without danger of breakage and are flexible so that the EL panel lamps may be bent around corners or conformed to contoured surfaces as required. Although such EL lamps provide benefits over fluorescent lamps, they are relatively expensive in comparison to conventional fluorescent lamps.

Although EL lamps provide a flat flexible lamp, they are not entirely satisfactory for general lighting applications which typically require much higher or brighter intensity than that producable by such electroluminescent lamps. Additionally, the life of such lamps is limited and more expensive to produce because EL phosphor is more expensive than fluorescent phosphor such as used in fluorescent lamp tubes.

Accordingly, it would be desirable to combine the benefits of fluorescent lamps and electroluminescent lamps to provide a flat, flexible fluorescent lamp to provide benefits not available in either EL lamps or in fluorescent lamps.

It is an object therefore of the present invention to provide flexible fluorescent lamp that has a brighter intensity, longer life, lower cost to manufacture and a lower operating cost.

It is a further object of the present invention to provide a self-luminous base lamp material for construction of a flat flexible fluorescent lamp.

SUMMARY OF THE INVENTION

In accordance with the present invention, a self-luminous base lamp material for construction of a flat, flexible fluorescent lamp and a flat flexible fluorescent lamp made there from is presented. The self-luminous base lamp material includes a front electrode comprising a continuous coil of ITO/PET film; a rear electrode comprising a continuous coil of aluminum foil polyester film; an ultraviolet light source carried between the front electrode and the rear electrode for emitting ultraviolet light in response to an excitation field created between the front electrode and the rear electrode, and a layer of fluorescent particles in proximity to the ultraviolet light source for emitting visible light in response to absorbing the ultraviolet light. The ultraviolet light source may comprise a glass microsphere containing an inert gas or alternately may comprise UV phosphor particles. In one embodiment, the fluorescent particles are carried in the glass microsphere along with the inert gas. The fluorescent particles may be fluorescent phosphor particles, sulfur particles or sulfur gas. A flat flexible fluorescent lamp constructed using the self-luminous base lamp material is also presented.

BRIEF DESCRIPTION OF THE DRAWINGS

FIG. 7 is a cross sectional view of a self-luminous base lamp material for construction of a flat, flexible fluorescent lamp in a third embodiment of the present invention.

FIG. 8 is a cross sectional view of a first alternate embodiment of the self-luminous base lamp material illustrated in FIG. 7.

FIG. 9 is a cross sectional view of a second alternate embodiment of the self-luminous base lamp material illustrated in FIG. 7.

FIG. 10 is a cross sectional view of a third alternate embodiment of the self-luminous base lamp material illustrated in FIG. 7.

WRITTEN DESCRIPTION OF PREFERRED EMBODIMENTS

Figure 1:
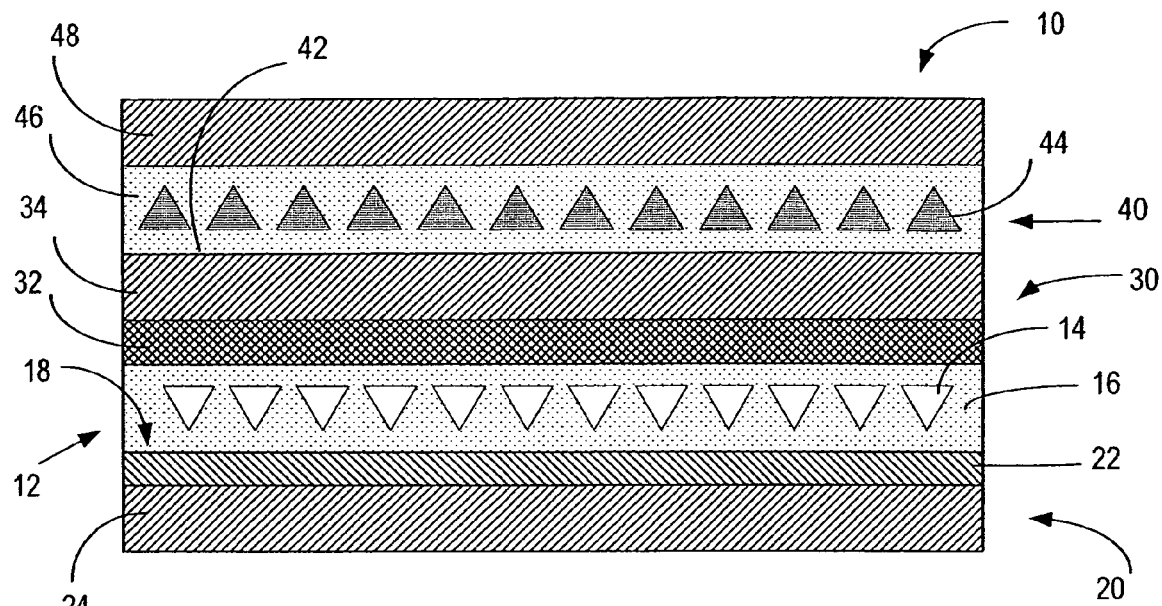
FIG. 1 is a cross sectional view of a self-luminous base lamp material for construction of a flat, flexible fluorescent lamp in a first embodiment of the present invention.

Turning now to the drawings and considering the invention in further detail, the basic concept and operating principles of the present invention are illustrated in a first embodiment of a self-luminous base lamp material forming the basis for the construction of a flat, flexible fluorescent lamp of the present invention. It should be noted that the drawings are not to scale and are presented schematically throughout to provide an understanding of the present invention. FIG. 1 illustrates a cross sectional view of the self-luminous base lamp material and is generally designated 10 and comprises a layer 12 of UV (ultraviolet) emitting phosphor particles 14 mixed in an organic binder 16 to form a solids in a binder system which is deposited on the surface 18 of an aluminum/polyester film (AL/PET) 20 wherein the aluminum 22 forms and defines a rear foil conductor protected by the polyester (PET) layer 24. A clear front conductor layer 30 comprising an ITO (indium tin oxide)/polyester (PET) film wherein the ITO 32 is in facing relation with the UV emitting phosphor/binder layer 12 to sandwich the UV emitting phosphor/binder layer 12 with the aluminum/PET layer 30. The polyester layer 34 is transparent. A fluorescent phosphor/binder layer 40 is deposited on the outward facing surface 42 of the ITO/PET layer 30 and comprises fluorescent phosphor particles 44 in an organic binder 46. The fluorescent phosphor/binder layer 40 is covered by a clear polyester film 48. The UV light emitting phosphor particles 14 are selected such that they emit UV light at a 254 nanometer wavelength such that when an electrical voltage potential is applied to the rear foil conductor 22 and the ITO clear front conductor 30, energy is capacitively coupled to the UV emitting phosphor 14 causing it to emit a photon at the 254 nanometer wavelength which is absorbed by the fluorescent phosphor particle 44 causing it to emit a photon in the visible light range to produce the desired illumination or light. The fluorescent phosphor particles 44 are substantially identical to the phosphor powder used in coating the inner surface of conventional fluorescent lamp tubes. The self-luminous base material 10 embodying the present invention is produced using roll-to-roll manufacturing techniques and systems such as disclosed in the above referenced patent disclosures and are producable in sizes up to 54 inches wide by 2400 feet long with currently known materials.

Figure 2:
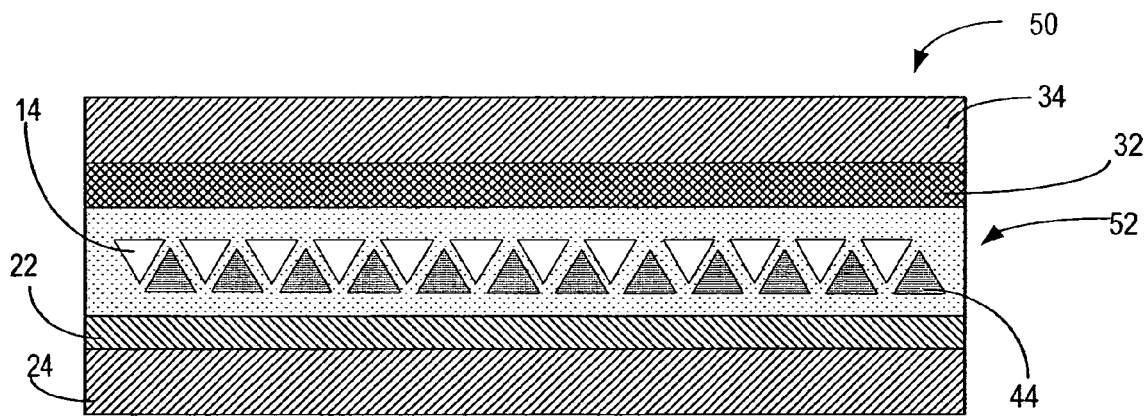
FIG. 2 is a cross sectional view of an alternate embodiment of the self-luminous base lamp material illustrated in FIG. 1.

FIG. 2 is a cross sectional view of the self-luminous base lamp material embodying the present invention and is generally designated 50 and is similar to the self-luminous base lamp material illustrated in FIG. 1 wherein like reference numerals refer to like parts throughout this disclosure. As illustrated in FIG. 2, the UV emitting phosphor particles 14 and fluorescent phosphor particles 44 are combined and mixed in an organic binder to form a solids in a binder system single layer 52 between the rear foil conductor 22 and the ITO clear front conductor 32. In this instance, applying the voltage across the rear foil conductor 22 and ITO clear front conductor capacitively couples energy to the UV emitting phosphor particles 14 causing them to emit a UV photon to excite the fluorescent phosphor particle 44 to emit a photon having a wavelength in the visible light range. Accordingly, it can be seen that the operating principle of the present invention utilizes a photon in the UV wavelength range which is absorbed by a fluorescent particle causing it to emit a photon in the visible light range.

Figure 3:
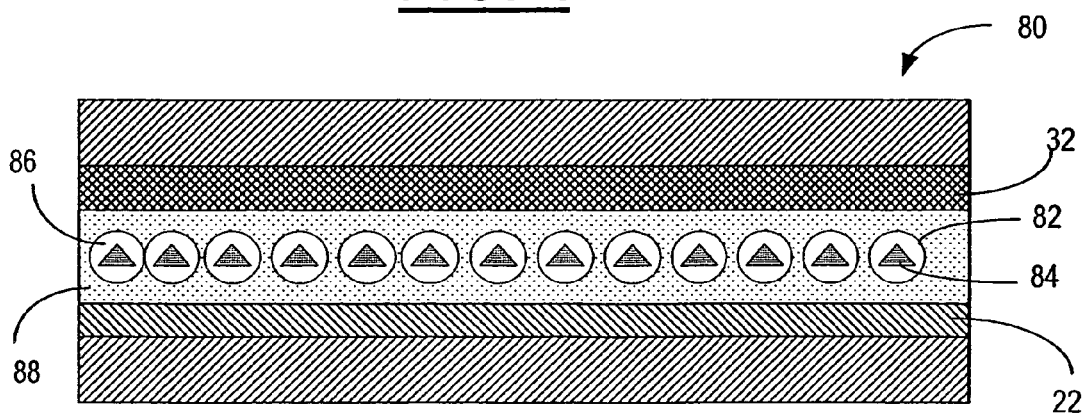
FIG. 3 is a cross sectional view of a self-luminous base lamp material for construction of a flat, flexible fluorescent lamp in a second embodiment of the present invention.

Turning now to FIG. 3, a cross sectional view of a self-luminous base lamp material for use in construction of a flat, flexible fluorescent lamp embodying the present invention is illustrated therein and generally designated 80. In this embodiment, a microsphere or glass vessel 82 approximately 40 microns in diameter encloses a fluorescent phosphor particle 84 and is filled with an inert gas such as argon/mercury 86 and is mixed in an organic binder 88 to form a solids in binder system and is sandwiched between the rear foil conductor 22 of the aluminum/polyester (AL/PET) film and the ITO clear front conductor 32 of the indium tin oxide/polyester (ITO/PET) film. The binder 88 carrying the microsphere 82 is adhesive in nature to hold the AL/PET film to the ITO/PET film to form the self-luminous base lamp material 80. When a proper voltage potential and frequency is applied between the rear foil conductor 22 and the ITO front conductor 32 a field is created there between and causes the argon/mercury gas 86 within the microsphere 82 to ionize and emit a photon in the ultraviolet (UV) light range which is absorbed by the fluorescent phosphor particle 84 causing it to emit a photon in the visible light range to produce visible light.

Figure 4:
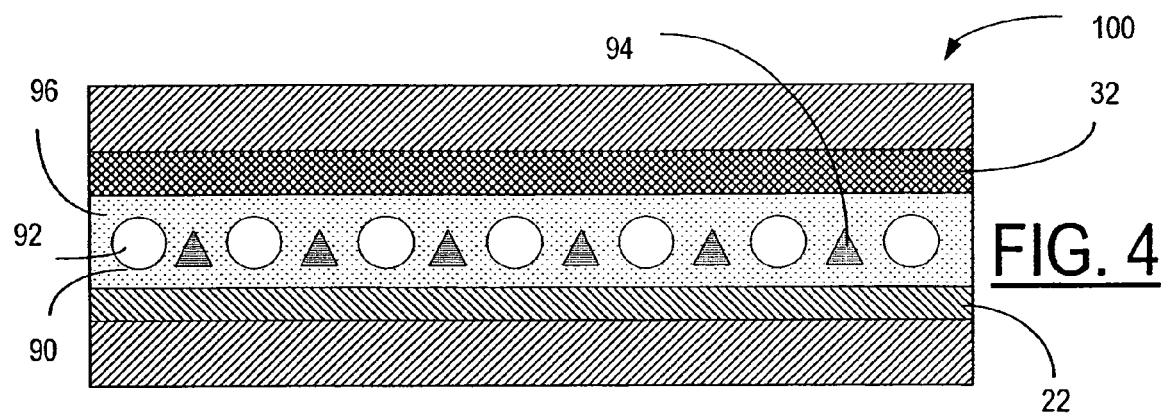
FIG. 4 is a cross sectional view of a first alternate embodiment of the self-luminous base lamp material illustrated in FIG. 3.

FIG. 4 is a cross sectional view of a first alternate embodiment of the self-luminous base lamp material illustrated in FIG. 3 for use in construction of a flat flexible fluorescent lamp embodying the present invention and is generally designated 100. In this embodiment, a microsphere approximately 40 microns in diameter generally designated 90 is filled with an inert gas such as argon/mercury 92 and is mixed together with fluorescent phosphor particles 94 in an organic binder 96 to form a solids in binder system which is sandwiched between the rear foil conductor 22 of the AL/PET film and defines a rear electrode for the flat, flexible fluorescent lamp. The organic binder 96 carrying the microsphere 92 and fluorescent phosphor particle 94 is sandwiched on the side opposite the rear foil conductor by the ITO/PET film with the clear front conductor ITO 32 in contact with the binder 96 and defines the front electrode for the flat, flexible fluorescent lamp. When a voltage having a suitable magnitude and frequency is applied between the rear foil conductor 22 and the ITO front conductor 32 a field is created there between and causes the argon/mercury gas 92 within the microsphere 90 to ionize and emit a photon in the ultraviolet light range which is in turn absorbed by the fluorescent phosphor particle 94 causing it to emit a photon in the visible light range to produce the desired illumination or light.

Figure 5:
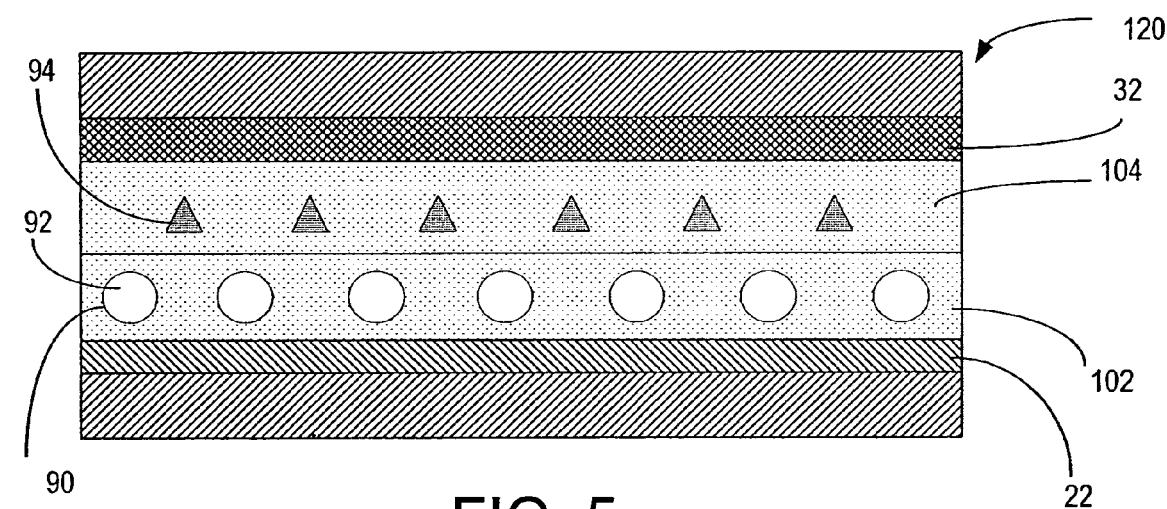
FIG. 5 is a cross sectional view of a second alternate embodiment of the self-luminous base lamp material illustrated in FIG. 3.

FIG. 5 is a cross sectional view of a second alternate embodiment of the self-luminous base lamp material illustrated in FIG. 3 for use in construction of a flat, flexible fluorescent lamp embodying the present invention and is generally designated 120. The basic difference between the embodiment illustrated in FIG. 4 and embodiment illustrated in FIG. 5 is the microsphere 90 filled with the inert gas such as argon/mercury 92 is mixed in an organic binder 102 to form a solids in binder system which is applied to the surface of the rear foil conductor 22 defining the rear electrode for the flat, flexible fluorescent lamp. Fluorescent phosphor particles 94 are mixed with a suitable organic binder 104 to form a solids in binder system which is applied between microsphere-binder layer and the ITO front conductor 32 defining the front electrode of the flat, flexible fluorescent lamp. When a voltage potential of a suitable magnitude and frequency is applied between the rear foil conductor 22 and the ITO front conductor 32 a field is created across the microsphere and phosphor particle binder layers which causes the inert gas such as argon/mercury 92 within the microsphere 90 to emit a photon in the ultraviolet light range which is captured by the fluorescent particle 94 causing it in turn to emit a photon in the visible light range to produce the desired illumination or light.

Figure 6:
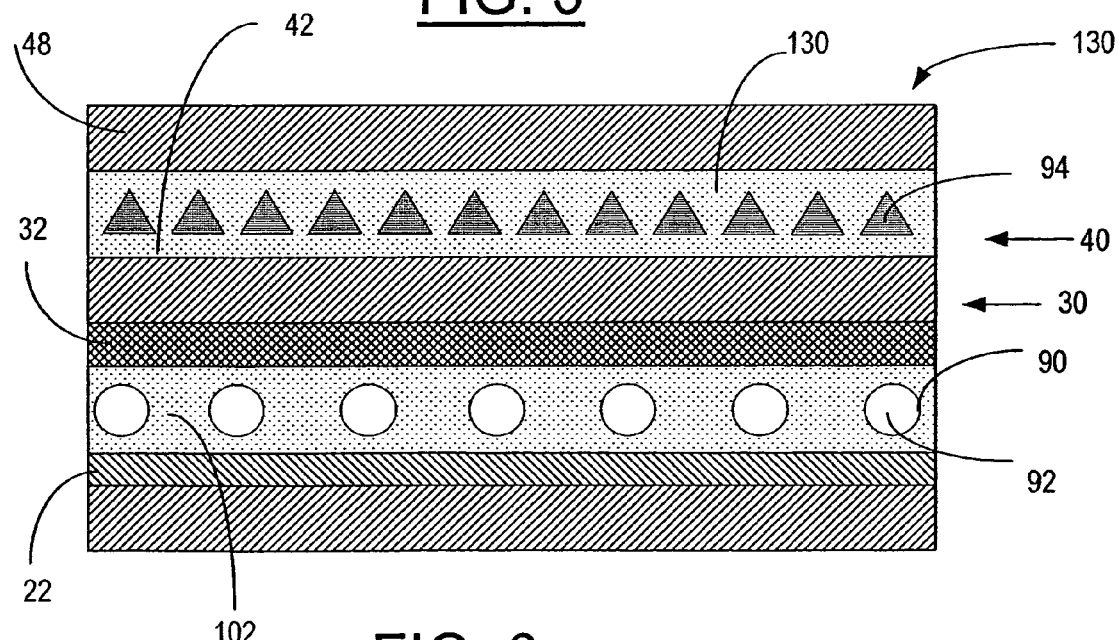
FIG. 6 is a cross sectional view of a third alternate embodiment of the self-luminous base lamp material illustrated in FIG. 3.

FIG. 6 is a cross sectional view of a third alternate embodiment of the self-luminous base lamp material illustrated in FIG. 3 for construction of a flat, flexible fluorescent lamp embodying the present invention and is designated generally 130. In this embodiment, a microsphere 90 is filled with an inert gas such as argon/mercury 92 and is mixed in an organic binder 102 to form a solids in binder system which is sandwiched between the rear foil electrode 22 and the front ITO conductor 32 defining the front electrode of the flat, flexible fluorescent lamp. When a voltage potential of a suitable magnitude and frequency is applied between the rear foil conductor 22 and the ITO front conductor 32 a field is created across the microsphere which causes the inert gas such as argon/mercury 92 within the microsphere 90 to emit a photon in the ultraviolet light range which is captured by the fluorescent particle 94 causing it in turn to emit a photon in the visible light range to produce the desired illumination or light.

Turning now to FIGS. 7, 8, 9 and 10, a cross sectional view of a third embodiment of a self-luminous base lamp material for use in construction of a flat, flexible fluorescent lamp embodying the present invention is illustrated therein. The embodiments illustrated in FIGS. 7, 8, 9 and 10 are substantially similar to the embodiments illustrated in FIGS. 3, 4, 5 and 6 respectively apart from the construction of the rear electrode. In FIGS. 7, 8, 9 and 10 the rear electrode of the lamp comprises a split electrode rear conductor 140 wherein the aluminum/polyester (AL/PET) has a slit or cut 142 extending through the AL/PET film 144 to the organic binder layer 88 carrying the microsphere 82 and fluorescent phosphor particle 84. A fluorescent phosphor/binder layer 40 is deposited on the outward facing surface 42 of the ITO/PET layer 30 and comprises fluorescent phosphor particles 94 in an organic binder 46. The fluorescent phosphor/binder layer 40 is covered by a clear polyester film 48. When a voltage potential having a suitable magnitude and frequency is applied across the rear electrodes 112a and 112b formed in the rear foil conductor a field is developed between the rear electrodes and the ITO clear front conductor 32 which causes the argon/mercury gas 86 carried in the microsphere 82 to ionize and emit a photon in the ultraviolet light range which in turn is absorbed by the fluorescent phosphor particle 84 causing it to emit a photon in the visible light range to produce the desired illumination or light.

The operation of a parallel plate lamp such as illustrated in FIG. 3 and a split electrode lamp such as illustrated in FIG. 6 is well known and understood by those skilled in the art and the reader is referred to the above referenced patents for further details and information.

Figure 11:
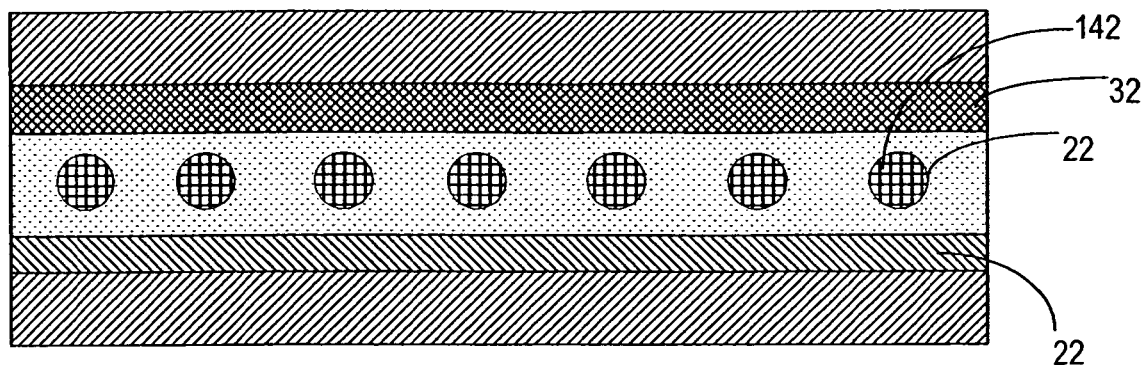
FIG. 11 is a cross section view of a self-luminous base lamp material for construction of a flat, flexible fluorescent lamp in a fourth embodiment of the present invention.
Figure 12:
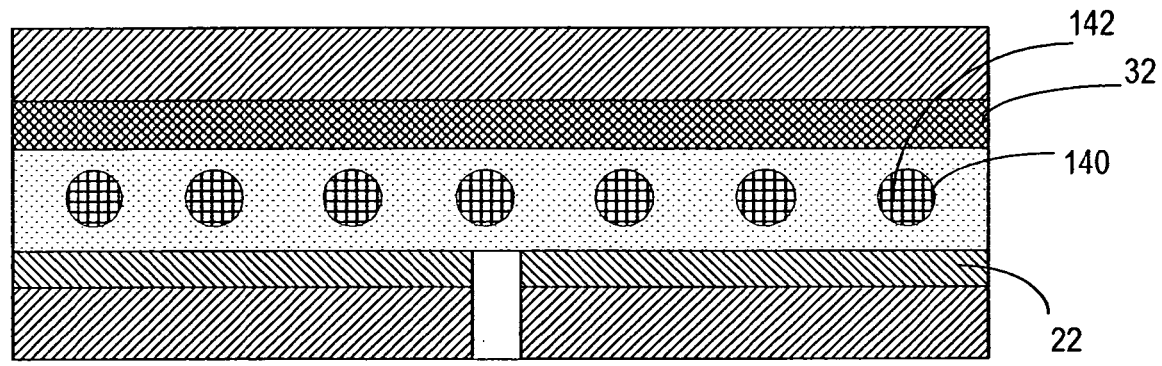
FIG. 12 is a cross sectional view of a self-luminous base lamp material for construction of flat, flexible fluorescent lamp in a fifth embodiment of the present invention.

FIGS. 11 and 12 illustrate schematically a self-luminous lamp material for construction of a flat, flexible fluorescent lamp in alternate embodiments of the present invention in a parallel plate and split-electrode construction configuration. In these embodiments, a glass microsphere 140 approximately 40 microns in diameter is filled with sulfur particles or gas and inert argon gas 142 and when energized by a field created when a voltage of the proper magnitude and frequency is applied between the rear foil conductor 22 defining the rear electrode for the lamp and the ITO front conductor 32 defining the front electrode for the lamp causes the sulfur to form a plasma that glows brightly to produce the desired illumination and light.

Electrical and mechanical connections are made to the self-luminous lamp material using any suitable connection method and arrangement such as illustrated and disclosed in the above referenced patents or in any other manner well known to those skilled in the art to carry out the intended function.

The invention claimed:

1. A flat flexible fluorescent lamp, comprising:
   a front electrode comprising a continuous coil of ITO/PET film;
   a rear electrode comprising a continuous coil of aluminum foil polyester film;
   an ultraviolet light source, carried between said front electrode and said rear electrode, for emitting ultraviolet light in response to an excitation field created between said front electrode and said rear electrode, and
   a layer of fluorescent particles arranged in proximity to said ultraviolet light source for emitting visible light in response to absorbing ultraviolet light emitted from said ultraviolet light source.

2. The flat flexible fluorescent lamp as defined in claim 1 wherein said ultraviolet light source comprises a glass microsphere containing an inert gas.

3. The flat flexible fluorescent lamp as defined in claim 2 wherein said fluorescent particles are carried in said glass microsphere.

4. The flat flexible fluorescent lamp as defined in claim 3 wherein said fluorescent particles are sulfur particles.

5. The flat flexible fluorescent lamp as defined in claim 3 wherein said fluorescent particles are sulfur gas.

6. The flat flexible fluorescent lamp as defined in claim 1 wherein said ultraviolet light source comprises UV phosphor particles.

7. The flat flexible fluorescent lamp as defined in claim 1 wherein said fluorescent particles are fluorescent phosphor particle.

8. Apparatus, comprising:
   a flat, flexible fluorescent lamp configured for emitting white light from a layer of fluorescent particles, in response to absorbing ultraviolet from an ultraviolet light source carried between a front electrode of ITO/PET film and a rear electrode of aluminum foil polyester film, in the presence of an excitation field between said front and rear electrodes.

* * * * *